United States Patent [19]

Teeter et al.

[11] Patent Number: 5,119,939

[45] Date of Patent: Jun. 9, 1992

[54] BUCKET CONVEYOR FRAME

[75] Inventors: Eugene W. Teeter; Cynthia G. Campbell; Jimmie F. Lassiter, Jr., all of San Antonio, Tex.

[73] Assignee: Meyer Machine Company, San Antonio, Tex.

[21] Appl. No.: 610,534

[22] Filed: Nov. 8, 1990

[51] Int. Cl.⁵ ............................................ B65G 21/009
[52] U.S. Cl. ............................. 198/860.2; 198/710; 198/838
[58] Field of Search ............... 198/701, 708, 712, 837, 198/838, 845, 710, 860.2, 861.1

[56] References Cited

U.S. PATENT DOCUMENTS

| | | | |
|---|---|---|---|
| 2,426,304 | 8/1947 | Hapman. | |
| 2,435,498 | 2/1948 | Hapman. | |
| 2,987,165 | 6/1961 | Sheehan | 198/708 |
| 3,031,066 | 4/1962 | Leach | 198/712 |
| 3,055,486 | 9/1962 | Meyer. | |
| 3,442,370 | 5/1969 | Goodale | 198/860.2 |
| 3,508,642 | 4/1970 | Standley et al. | 198/838 |
| 3,795,305 | 3/1974 | Sandvik | 198/708 X |
| 4,146,126 | 3/1979 | Mattos | 198/861.1 |
| 4,722,433 | 2/1988 | Gough. | |
| 4,890,722 | 1/1990 | Gough | 198/712 X |
| 4,892,179 | 1/1990 | Lassiter, Jr. et al.. | |
| 4,934,516 | 6/1990 | Dugan | 198/860.2 |

Primary Examiner—Joseph E. Valenza
Attorney, Agent, or Firm—Richard J. Smith

[57] ABSTRACT

A bucket conveyor frame. At least one horizontal section and one vertical section are connected by a curved section. Each section has a central support tube. A plurality of plates connected to the support tube lie in approximately vertical planes. Upper and lower chain hold downs extend the length of the sections. A transport track delivers products from an infeed station to a discharge station and a return track returns the buckets to the infeed station in a continuous loop. Chain sprockets are located within enclosed housings at the infeed and discharge stations.

7 Claims, 9 Drawing Sheets

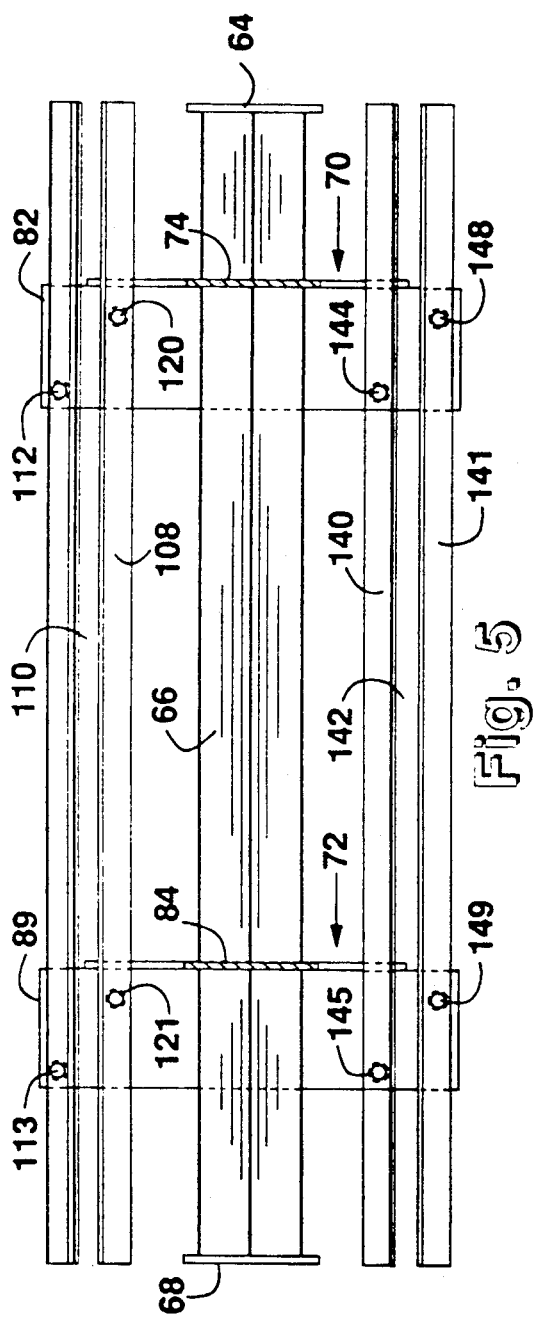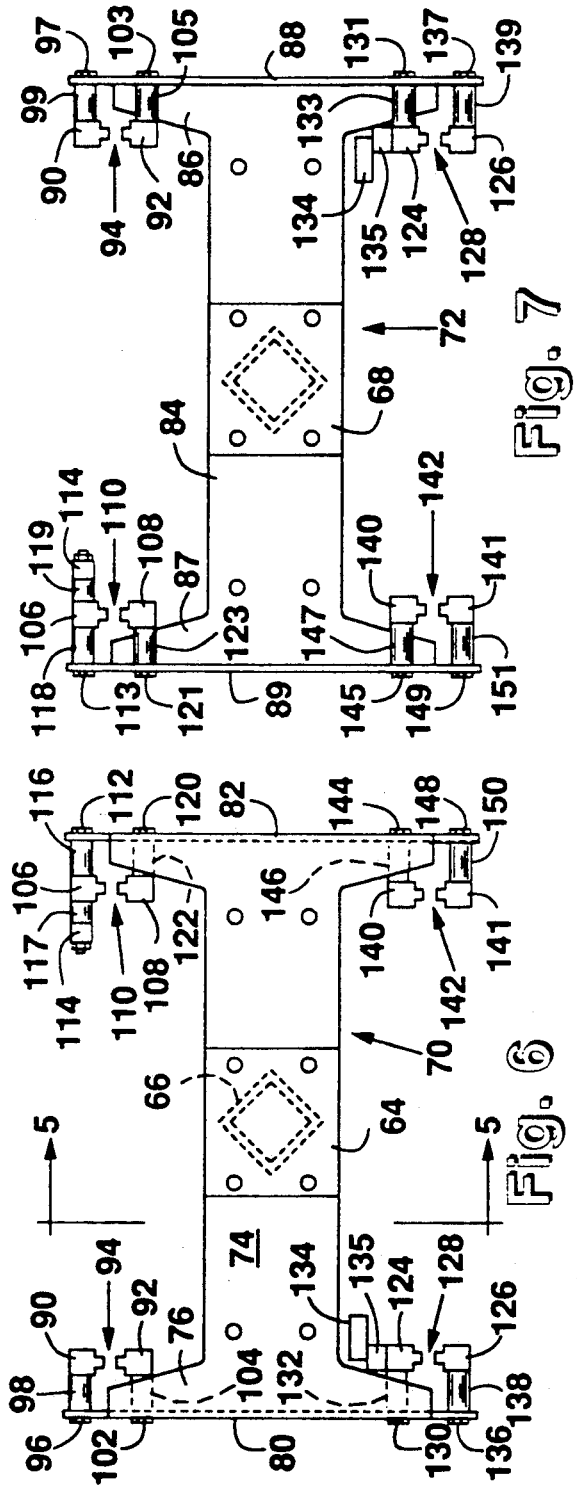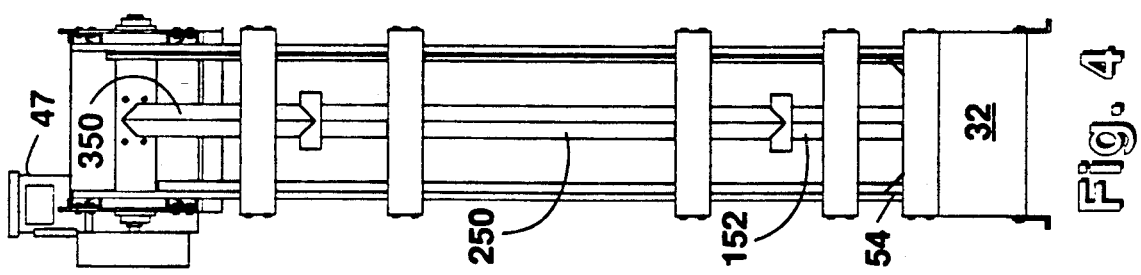

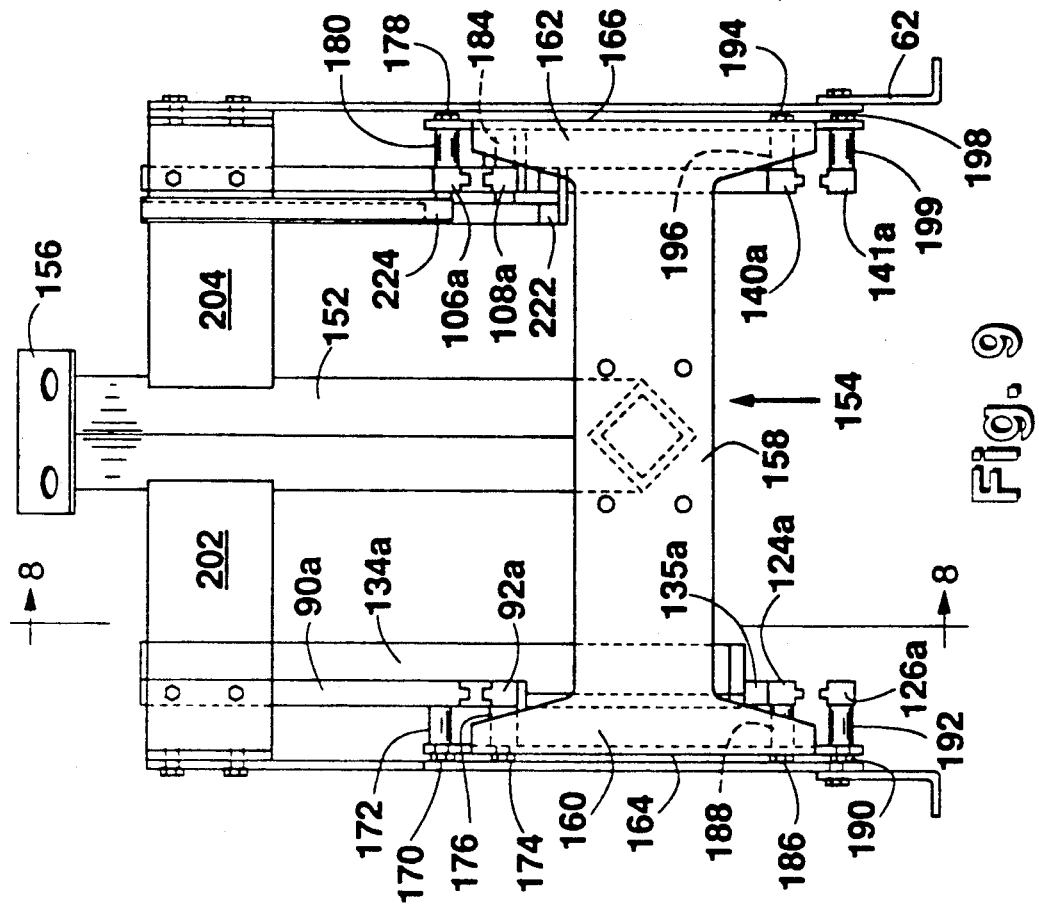
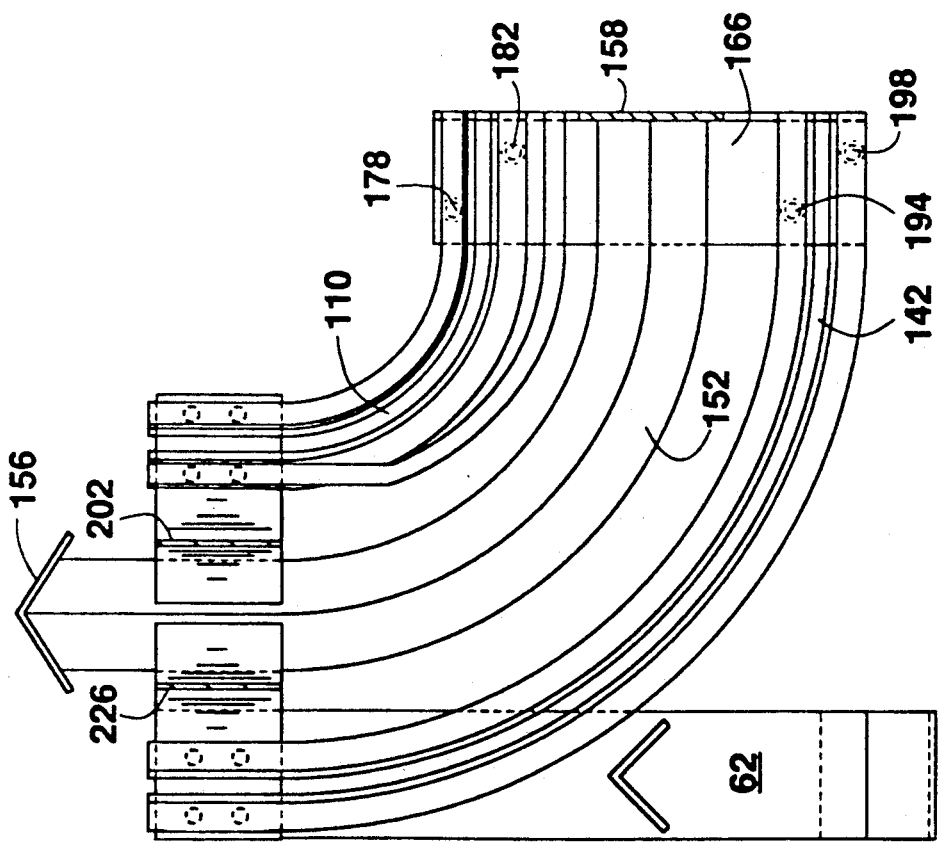
Fig. 9
Fig. 8

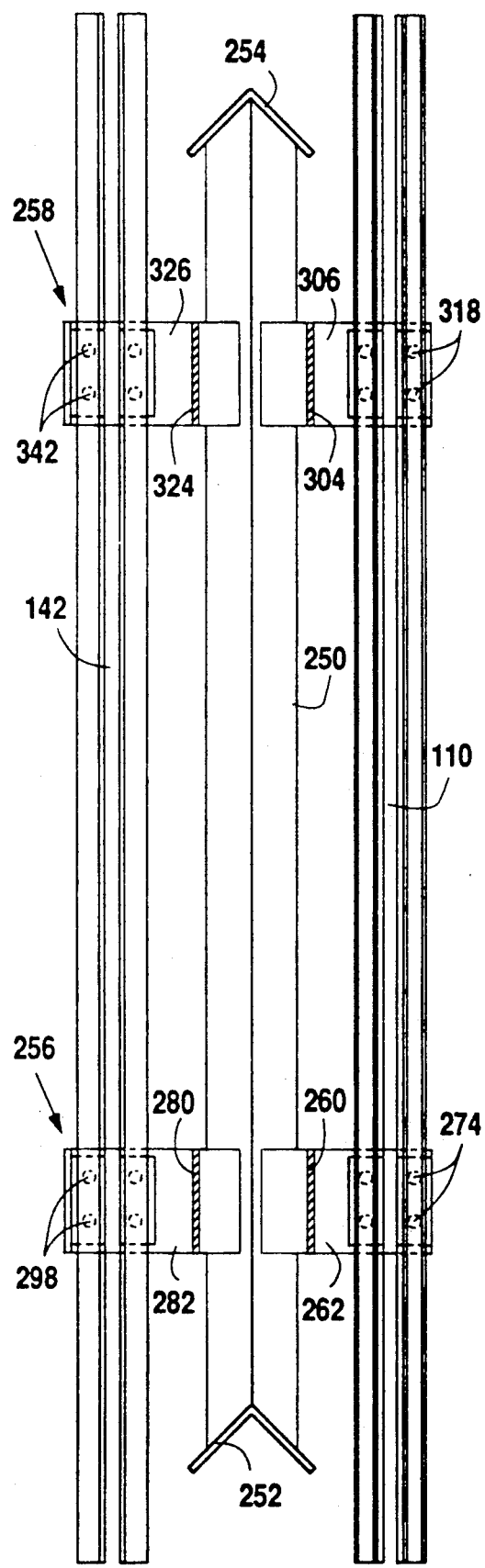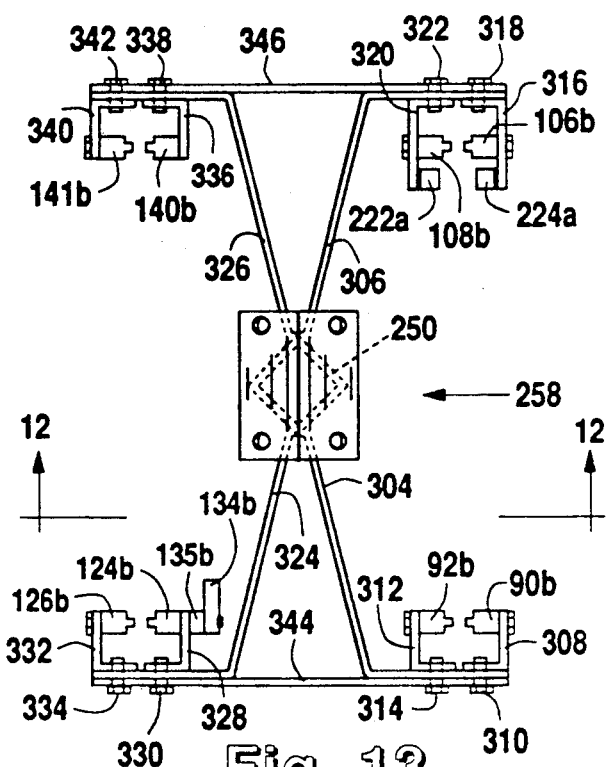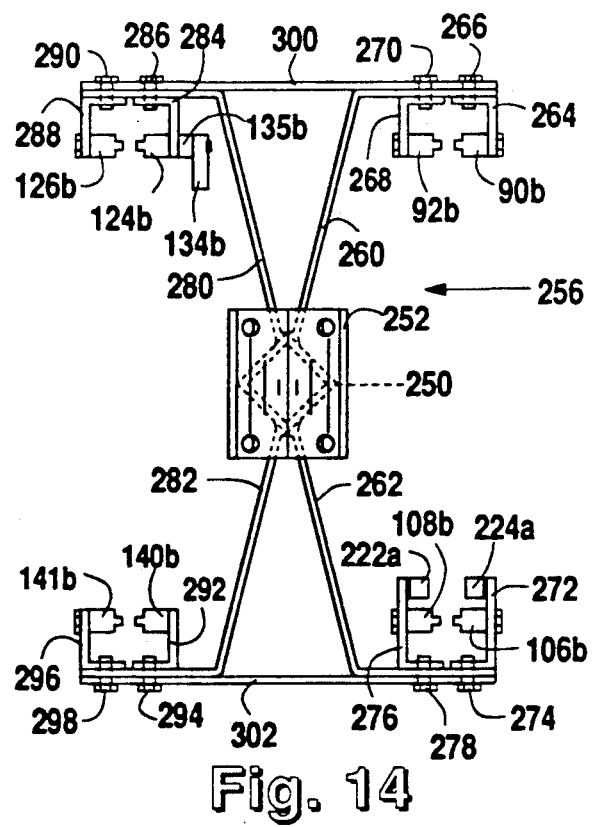

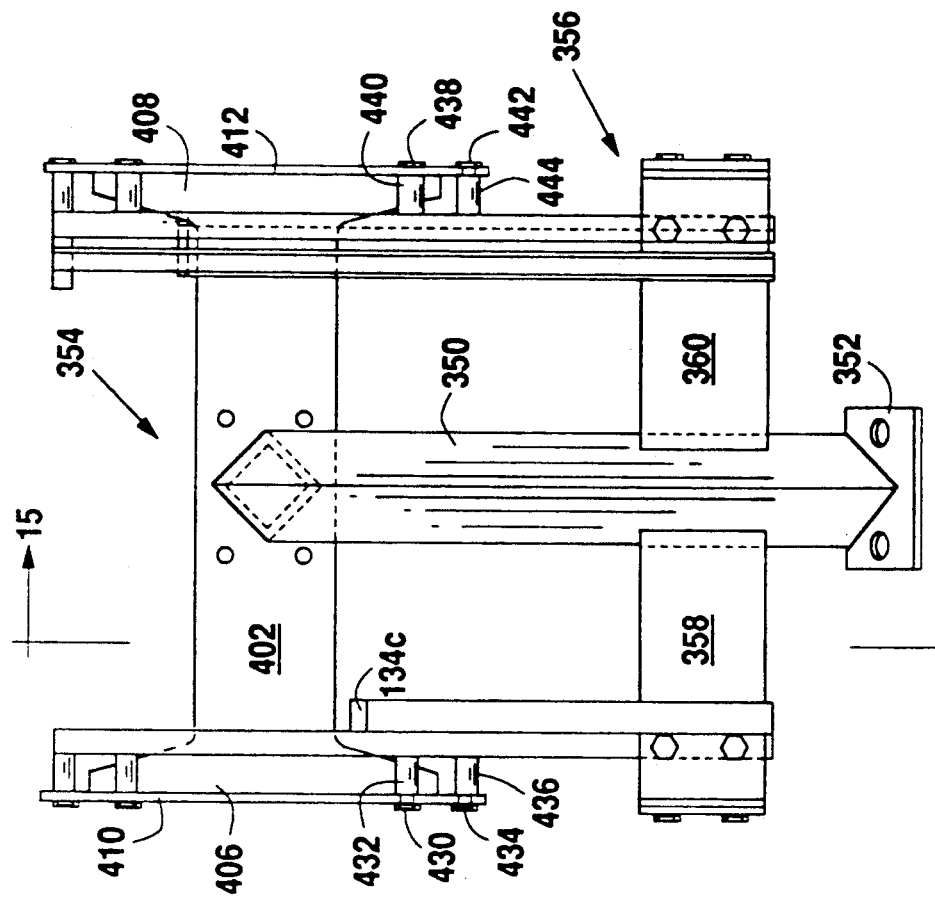
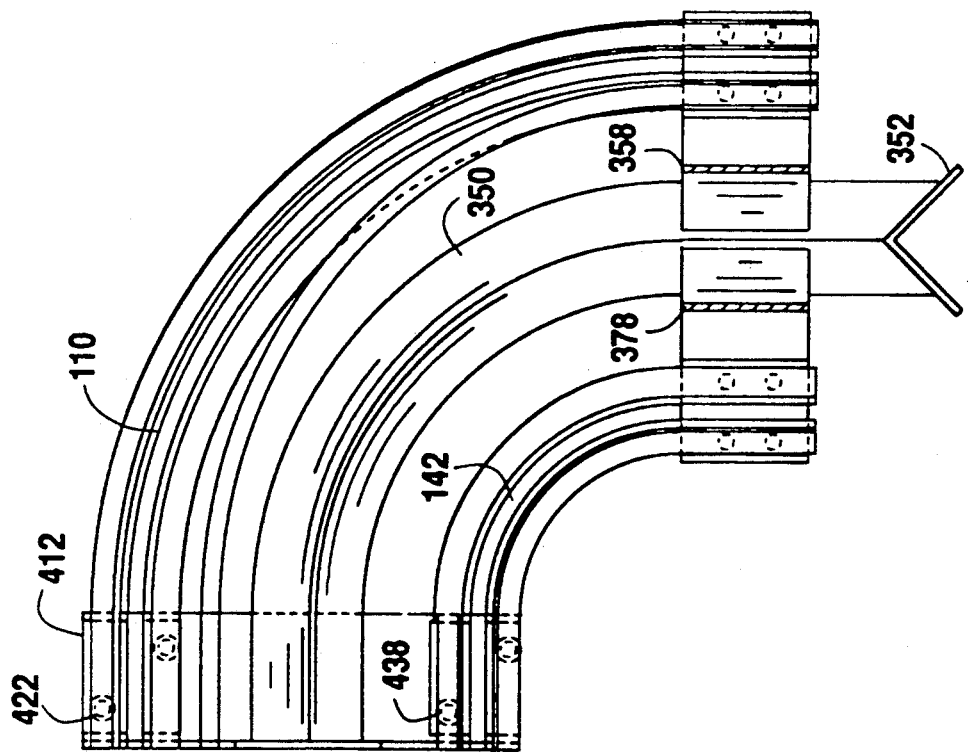
Fig. 16
Fig. 15

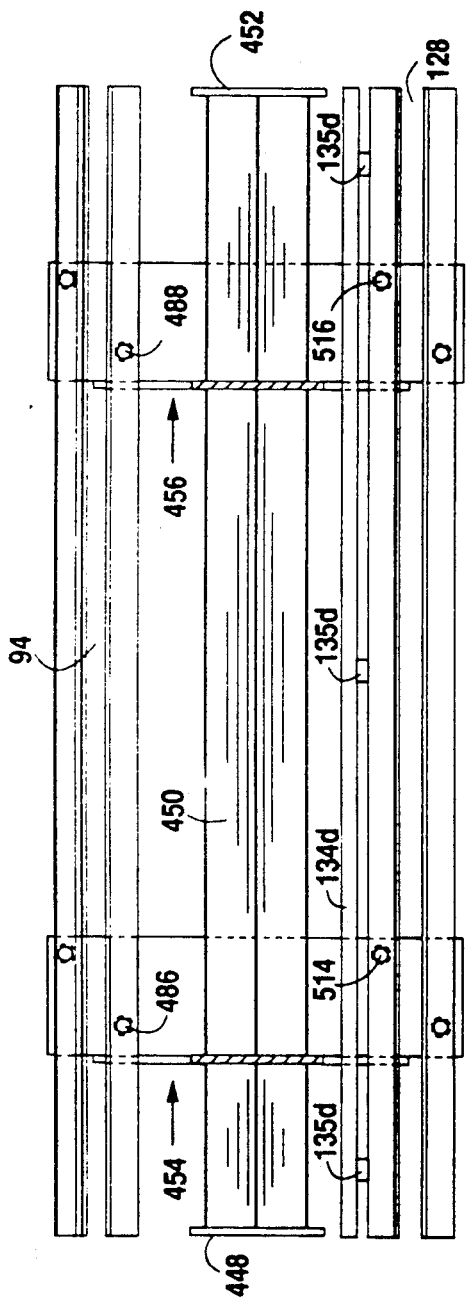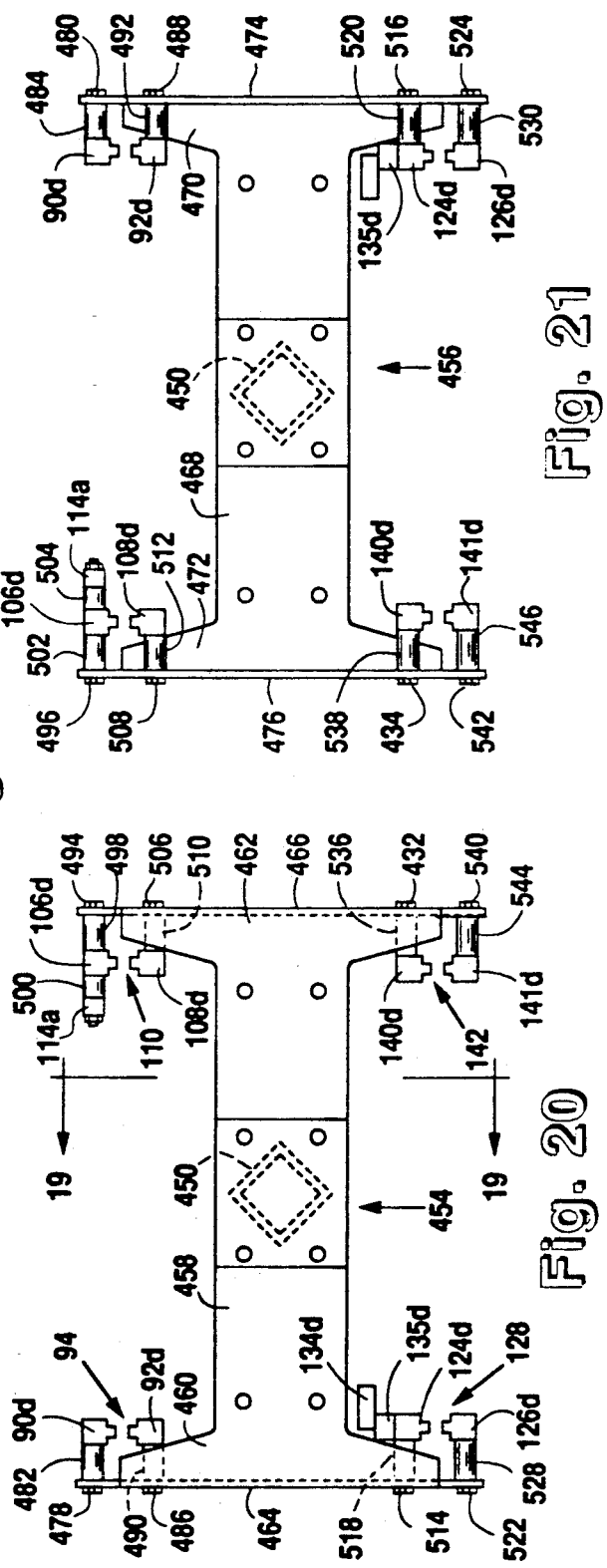

BUCKET CONVEYOR FRAME

FIELD OF THE INVENTION

The present invention relates to bucket conveyors. More particularly, the present invention relates to a bucket conveyor frame which facilitates maintenance and cleaning of the bucket conveyor.

BACKROUND OF THE INVENTION

The use of bucket conveyors for transporting products from an infeed station to a distribution station is well known in the art. An example of such a conveyor is illustrated in U.S. Pat. No. 3,055,486 wherein buckets travel to and from an infeed station in a continuous loop. Conveyors are typically supported by a frame. Substantially horizontal belt conveyors may be supported by a frame having a central rectangular tube turned at an angle of approximately forty five degrees to the belts and a plurality of rectangular plates positioned below the belts in substantially vertical planes. Bucket conveyors may have horizontal sections, corner sections, and vertical sections supported by tubes similar to that shown in U.S. Pat. No. 4,892,179.

SUMMARY OF THE INVENTION

The present invention provides an improved bucket conveyor frame. The frame facilitates maintenance and cleaning of the conveyor by providing an open frame structure, eliminating the need for intermediate sprockets, and reducing the areas for debris to collect on.

The bucket conveyor frame of the present invention comprises at least one horizontal section, at least one vertical section, and at least one curved section connecting the horizontal section to the vertical section. A drive sprocket housing is positioned at one end of the frame and an idler sprocket housing is positioned at the opposite end of the frame. The frame sections have tubes extending through approximately the center thereof. The horizontal frame section comprise support plates lying in substantially vertical planes. Further, the central tube is angled at approximately forty five degrees to horizontal so that a corner of the tube points toward the buckets. Angled connection plates connect the corner sections to the vertical section and top and bottom chain hold downs are provided which extend substantially the entire length of the frame.

BRIEF DESCRIPTION OF THE DRAWINGS

FIG. 4 is an end view of the bucket conveyor of FIG. 1.

FIG. 5 is a cross sectional view of the lower horizontal section of the bucket conveyor frame of the present invention taken along section lines 5—5 of FIG. 6.

FIG. 6 is an end view of the lower horizontal section of the bucket conveyor frame of the present invention as viewed from the infeed station.

FIG. 7 is an end view of the lower horizontal section of the bucket conveyor frame of the present invention from the lower corner section of the bucket conveyor frame.

FIG. 8 is a cross sectional view of the lower corner section of the bucket conveyor frame of the present invention taken along section lines 8—8 of FIG. 9.

FIG. 9 is an end view of the lower corner section of the bucket conveyor frame of the present invention.

FIG. 12 is a cross sectional view of the vertical section of the bucket conveyor frame of the present invention taken along section lines 12—12 of FIG. 13.

FIG. 13 is a top view of the vertical section of the bucket conveyor frame of the present invention.

FIG. 14 is a bottom view of the vertical section of the bucket conveyor frame of the present invention.

FIG. 15 is a cross sectional view of the upper corner section of the bucket conveyor frame of the present invention taken along section lines 15—5 of FIG. 16.

FIG. 16 is an end view of the upper corner section of the bucket conveyor frame of the present invention as viewed from the infeed station.

FIG. 19 is a cross sectional view of the upper horizontal section of the bucket conveyor frame of the present invention taken along section lines 19—19 of FIG. 20.

FIG. 20 is an end view of the upper horizontal section of the bucket conveyor frame of the present invention as viewed from the upper corner section of the bucket conveyor frame.

FIG. 21 is an end view of the upper horizontal section of the bucket conveyor frame of the present invention as viewed from the discharge station.

DETAILED DESCRIPTION OF THE PREFERRED EMBODIMENT

Figure 1:
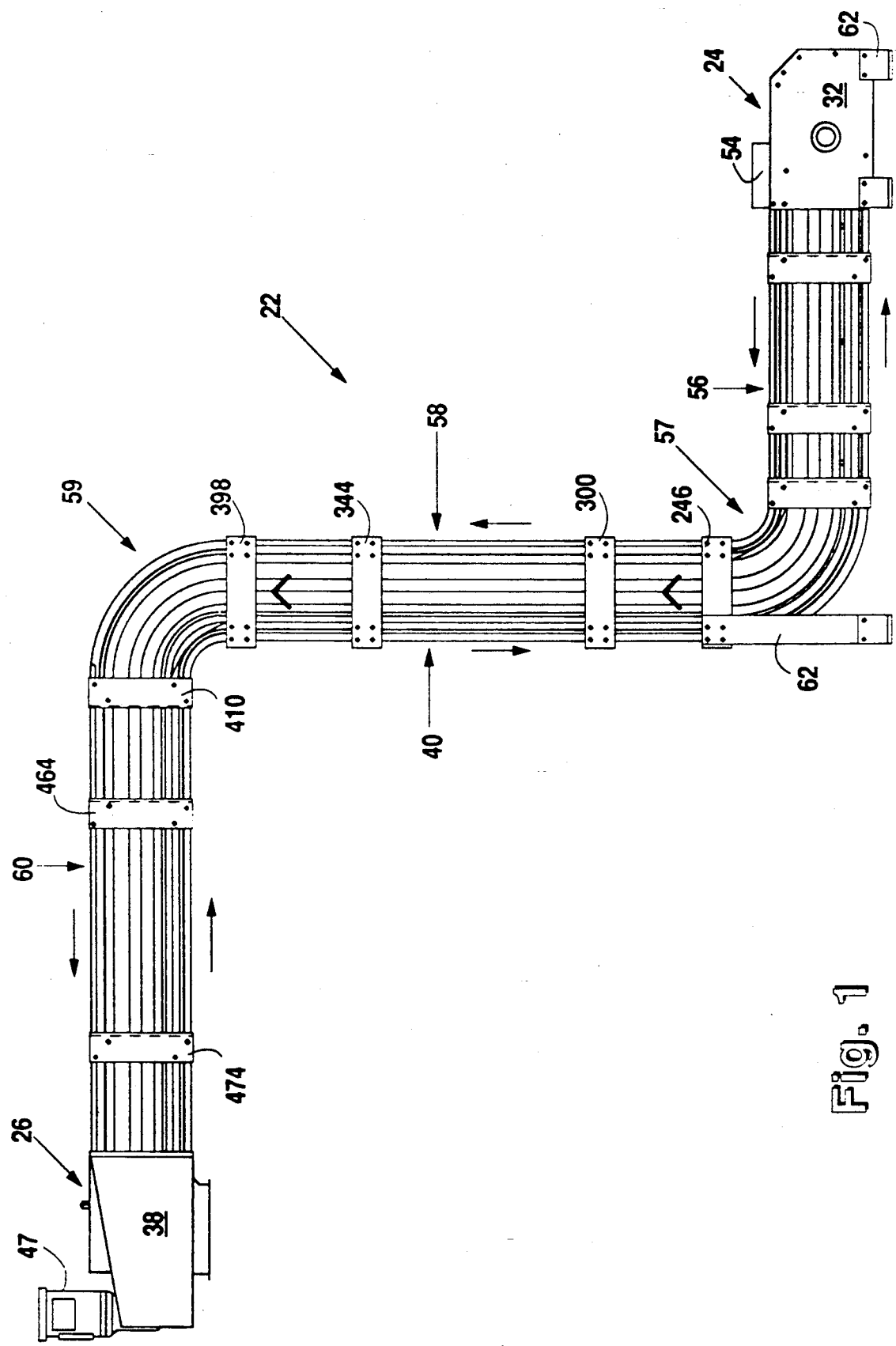
FIG. 1 is a side view of a bucket conveyor incorporating the bucket conveyor frame of the present invention.
Figure 3:
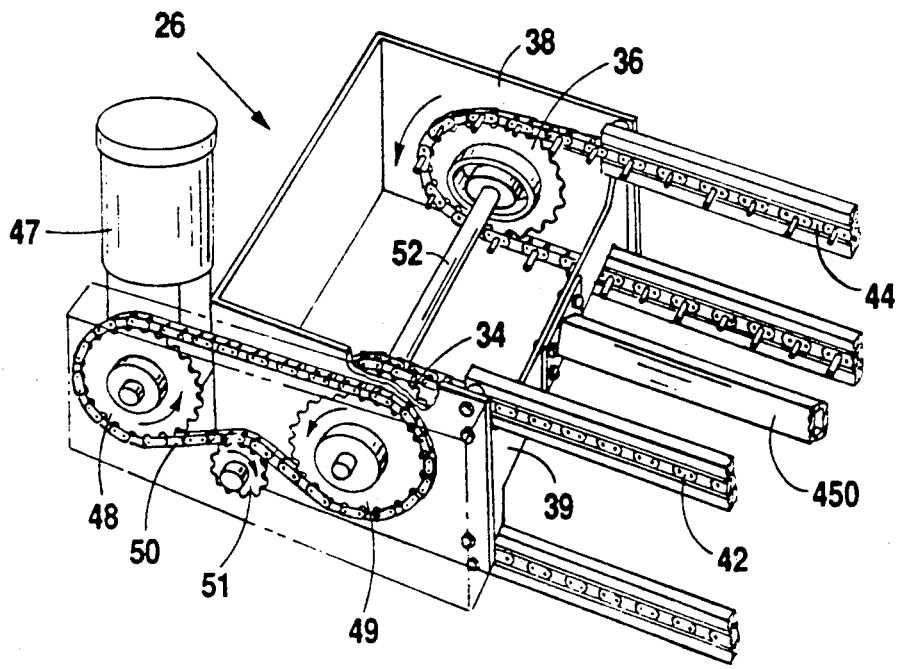
FIG. 3 is a perspective view of the end discharge station and drive section of the bucket conveyor of FIG. 1.
Figure 2:
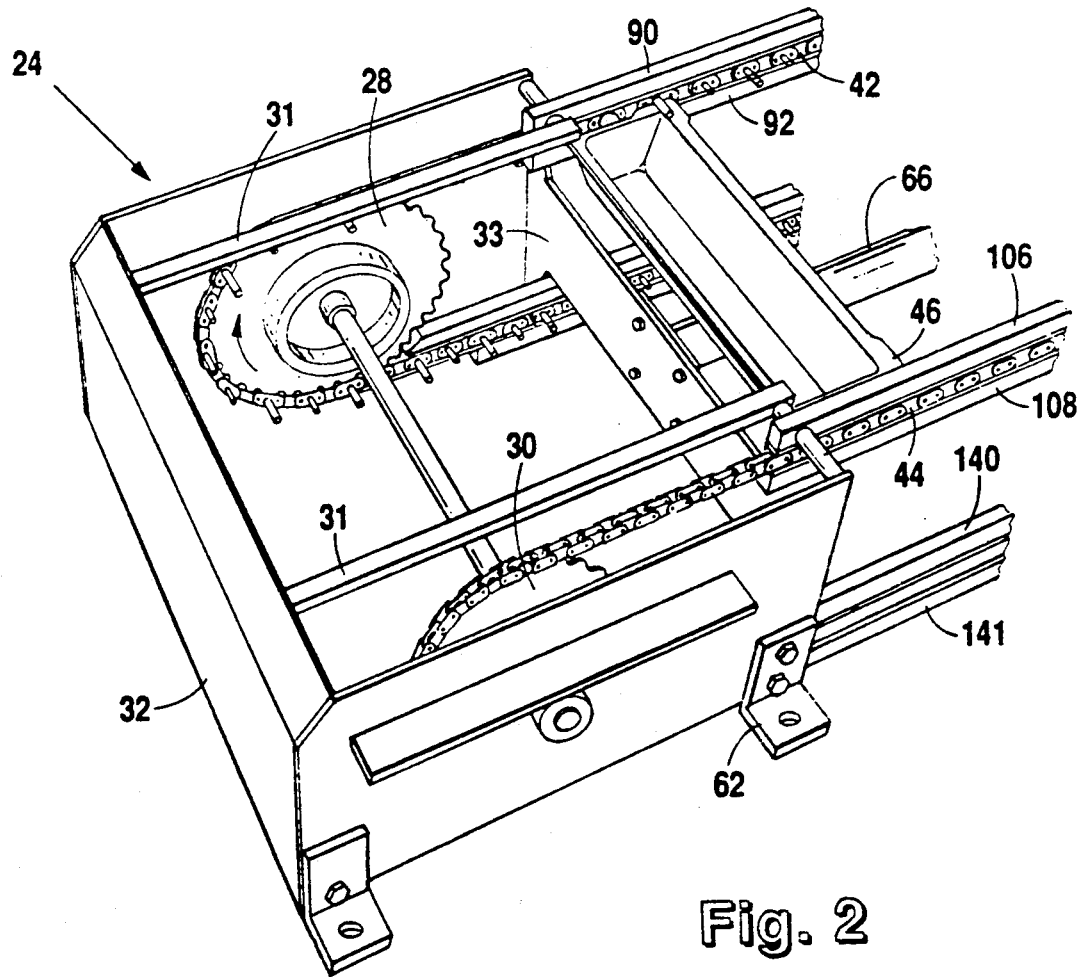
FIG. 2 is a perspective view of the infeed station of the bucket conveyor of FIG. 1.

Referrring to FIG. 1, a bucket conveyor incorporating the bucket conveyor frame of the present invention is identified by the number 22. The conveyor 22 comprises an infeed station 24 and a discharge station 26. Referring to FIG. 2, the conveyor 22 further comprises a pair of idler sprockets 28 and 30 which are appropriately mounted within infeed staion housing 32. Referring to FIG. 3, conveyor 22 further comprises a pair of drive sprockets 34 and 36 which are appropriately mounted within discharge station housing 38. Housings 32 and 38 form part of the conveyor frame 40 of the present invention. Housings 32 and 38 each have a removable top or cover (not shown) for enclosing the respective sprockets in their respective housing.

Referring again to FIG. 2 and FIG. 3, a first roller chain 42 is positioned about idler sprocket 28 and drive sprocket 34. A second roller chain 44 is positioned about idler sprocket 30 and drive sprocket 36. Each chain 42 and 44 is a continuous or closed strand of carrier roller chain and chains 42 and 44 pivotally support a plurality of buckets 46 in the manner as described in U.S. Pat. No. 4,892,179, the disclosure which is incorporated herein by reference. Roller chains 42 and 44 are driven by a drive motor 47 in the direction illustrated by the arrows in FIG. 1, FIG. 2 and FIG. 3. Drive motor 47 is operatively engaged with drive sprockets 34 and 36 in a conventional manner. Drive motor 47 is operatively engaged with a first drive motor sprocket 48 which is operatively engaged with a second drive motor sprocket 49 by a chain 50 which is positioned about sprockets 48 and 49. Chain 50 may also be engaged with an intermediate drive motor sproket 51. Drive motor sprocket 49 is operatively engaged with a drive shaft 52 which is operatively engaged with drive sprockets 34 and 36. Products are fed to the buckets 46 from a feed hopper 54 as the buckets 46 pass through infeed station 24. As the buckets 46 travel through discharge station 26, they are turned over so as to discharge the products therein.

Referring again to FIG. 1 and FIG. 2, the conveyor frame 40 further comprises a lower horizontal section 56, a lower corner section 57, a vertical section 58, an upper corner section 59, and an upper horizontal section 60. The frame 40 is supported by a plurality of legs 62 with the upper horizontal section 60 being supported from a ceiling by wires or beams (not shown) appropriately connected to upper conveyor section 60.

Referring to FIG. 5, FIG. 6 and FIG. 7, the lower horizontal section 56 will be described in greater detail. Section 56 comprises a first end plate 64 which is welded or otherwise connected to a longitudinal steel tube 66 on a first end thereof and a second end plate 68 which is welded or otherwise connected to longitudinal tube 66 on a second end thereof. As illustrated in FIG. 2, plate 64 is bolted to H-shaped side 33 of housing 32. Tube 66 extends through approximately the center of, and is welded or is otherwise connected to, a first H-shaped steel plate 70 and a second H-shaped steel plate 72. Plate 70 has a central web portion 74 and a pair of wings 76 and 78 on opposite ends thereof. A pair of opposed flanges 80 and 82 are integral with plate 70 and at approximately a right angle thereto. Likewise, plate 72 has a central web portion 84 and a pair of wings 86 and 87 on opposite ends thereof. A pair of oppositely disposed flanges 88 and 89 are integral with plate 72 at approximately a right angle thereto.

Referring again to FIG. 5, FIG. 6 and FIG. 7, section 56 further comprises a first transport track chain hold down 90 and a first transport track chain support 92. Chain hold down 90 and chain support 92 define an upper chain track 94 for roller chain 42. Chain hold down 90 is connected to flange 80 by a bolt 96 which extends through a hole in flange 80 and into hold down 90. Chain hold down 90 is also connected to flange 88 by a bolt 97 which extends through a hole in flange 80 into hold down 90. A spacer 98 is positioned about bolt 96 intermediate to flange 80 and chain hold down 90 and a spacer 99 is positioned about bolt 97 intermediate to flange 88 and chain hold down 90. Chain support 92 is connected to flange 80 by a bolt 102 which extends through a respective hole in flange 80 into chain support 92. Chain support 92 is also connected to flange 88 by a bolt 103 which extends through a hole in flange 88 into chain support 92. A spacer 104 is positioned about bolt 102 intermediate to flange 80 and chain support 92 and spacer 105 is positioned about bolt 103 intermediate to flange 88 and chain support 92.

Referring again to FIG. 5 and FIG. 6, a second transport track chain hold down 106 and a second transport track chain support 108 are connected to opposite flanges 82 and 89 and define an upper chain track 110 for chain 44. Chain hold down 106 is connected to flange 82 by a bolt 112 which extends through a hole in flange 82 into chain hold 106. Chain hold down 106 is also connected to flange 89 by a bolt 113 which extends through a hole in flange 89 into chain hold down 106. Bolts 112 and 113 also extend through hold down 106 into a bucket hold down bar 114. A spacer 116 is positioned about bolt 112 intermediate to hold down 106 and flange 82 and spacer 117 is positioned about bolt 112 intermediate to bucket hold down bar 114 and chain hold down 106. A spacer 118 is positioned about bolt 113 intermediate to hold down 106 and flange 89 and a spacer 119 is positioned about bolt 113 intermediate to hold down bar 114 and chain hold down 106. Chain support 108 is connected to flange 82 by a bolt 120 which extends through a hole in flange 82 into chain support 108. Chain support 108 is also connected to flange 89 by a bolt 121 which extends through a hole in flange 89 into support 108. A spacer 122 is positioned about bolt 120 intermediate to chain support 108 and flange 82 and a spacer 123 is positioned about bolt 121 intermediate to chain support 108 and flange 89.

Referring again to FIG. 5, FIG. 6 and FIG. 7, a first return track chain hold down 124 and a first return track chain support 126 define a lower chain track 128 for roller chain 42. Chain hold down 124 is connected to flange 80 by a bolt 130 which extends through a hole in flange 80 into chain hold down 124. Chain hold down 124 is also connected to flange 88 by a bolt 131 which extends through a hole in flange 88 into chain hold down 124. A spacer 132 is positioned about bolt 130 intermediate to flange 80 and hold down 124 and a spacer 133 is positioned about bolt 131 intermediate to flange to 88 and hold down 124. A bucket control bar 134 is also appropriately connected to hold down 124 and a plurality of spacers 135 are positioned intermediate to bar 134 and hold down 124. Chain support 126 is connected to flange 80 by a blot 136 which extends through a hole in flange 80 into chain support 126. Chain support 126 is also connected to flange 88 by a bolt 137 which extends through a hole in flange 88 into chain support 126. A spacer 138 is positioned about bolt 136 intermediate to chain support 126 and flange 80 and a spacer 139 is positioned about bolt 137 intermedite to flange 88 and chain support 126. A second return track chain hold down 140 and a second return track chain support 141 define a lower chain track 142 for chain 44. Chain hold ddown 140 is connected to flange 82 by a bolt 144 which extends through a hole in flange 82 into hold down 140. Chain hold down 140 is connected to flange 89 by a bolt 145 which extends through a hole in flange 89 into hold down 140. A spacer 146 is positioned about bolt 144 intermediate to flange 82 and hold down 140 and a spacer 147 is positioned about bolt 145 intermediate to flange 89 and hold down 140. Chain support 141 is connected to flange 82 by a bolt 148 which extends through a hole in flange 82 into chain support 141. Chain support 141 is also connected to flange 89 by a bolt 149 which extends through a hole in flange 89 into chain support 141. A spacer 150 is positioned about each bolt 148 intermediate chain support 140 and flange 82 and a spacer 151 is positioned about bolt 149 intermediate to flange 89 and chain support 141.

Referring again to FIG. 2, it is to be understood that chain track sections 90, 92, 106, 108, 124, 126, 140, and 141 may be bolted or otherwise connected to housing 32. Further, a pair of bucket hold down bars 31 may also be bolted or otherwise connected to housing 32.

Bars 31 maintain the stability of the buckets 46 as they pass through infeed station 24.

Figure 10:
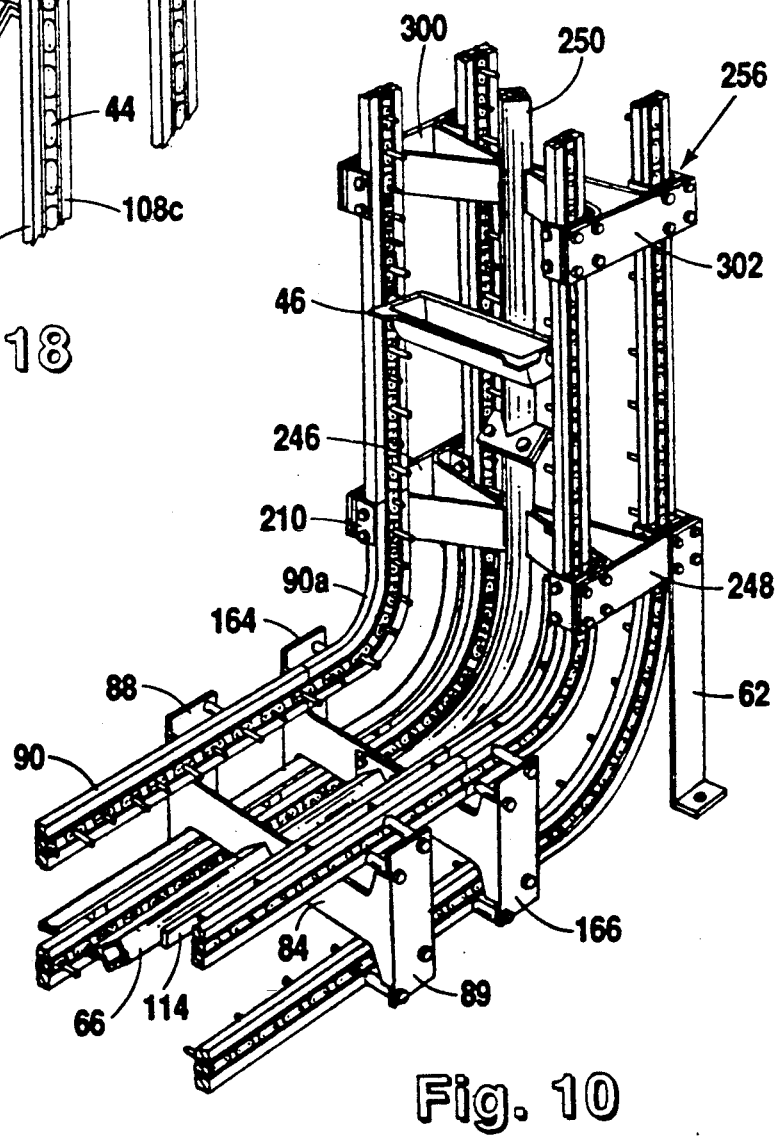
FIG. 10 is a perspective view of the lower corner section of the bucket conveyor frame of the present invention.
Figure 11:
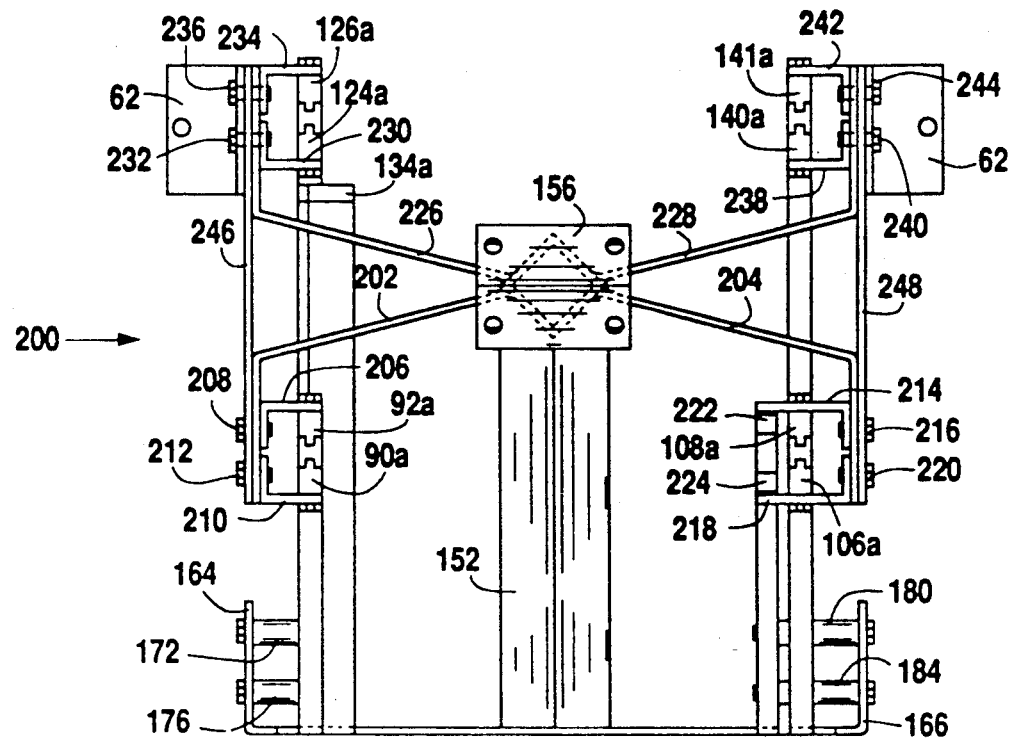
FIG. 11 is a top view of the lower corner section of the bucket conveyor frame of the present invention.
Figure 17:
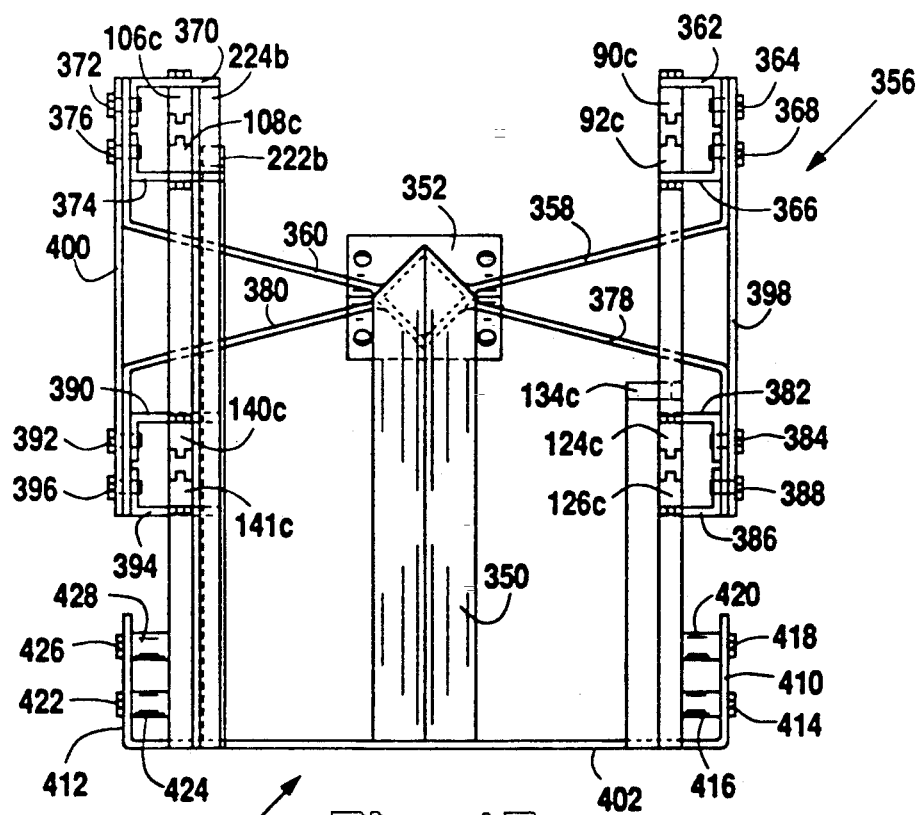
FIG. 17 is a top view of the upper corner section of the bucket conveyor frame of the present invention.

Referring to FIG. 8. FIG. 9, FIG. 10 and FIG. 11, the lower corner section 57 will be described in greater detail. Section 57 comprises a steel tube 152 which is welded or otherwise connected on one end thereof to an H-shaped steel plate 154 and welded or otherwise connected to an angled steel plate 156 on the opposite end thereof. As illustrated in FIG. 10, plate 68 of section 56 is bolted to plate 154. Plate 154 comprises a central web portion 158 and a pair of wings 160 and 162 on opposite ends of web 158. Plate 154 has a first flange 164 integral therewith at approximately a right angle to wing 160 and a second flange 166 integral therewith at approximately a right angle to wing 162. A chain hold down section 90a is connected to flange 164 by a bolt 170 which extends through a hole in flange 164 and into chain hold down 90a. A spacer 172 is positioned about bolt 170 intermediate chain hold down 90a and flange 164. A chain support section 92a is connected to flange 164 by a bolt 174 which extends through a hole in flange 164 into chain support 92a. A spacer 176 is positioned about bolt 174 intermediate to flange 164 and chain support 92a. Sections 90a and 92 define a track 94 for chain 42.

Referring again to FIG. 8 and FIG. 9, a transport track chain hold down section 106a is connected to flange 166 by a bolt 178 which extends through a hole in flange 166 into chain hold down 106a. A spacer 180 is positioned about bolt 78 intermediate to chain hold down 106a and flange 166. A chain support section 108a is connected to flange 166 by a bolt 182 which extends through a hole in flange 166 into chain support 108a. A spacer 184 is positioned about bolt 182 intermediate to flange 166 and chain support 108a. Sections 106a and 108a define a track 110 for chain 44.

Referring again to FIG. 8 and FIG 9, a chain hold down section 124a is connected to flange 164 by a bolt 186 which extends through a hole in flange 164 into chain hold down 124a. A spacer 188 is positioned about bolt 186 intermediate to flange 164 and chain hold down 124a. One end of a bucket control bar section 134a is connected to section 124a and a spacer 135a is positioned intermediate to bar 134a and section 124a. A chain support section 126a is connected to flange 164 by a bolt 190 which extends through a hole in flange 164 into chain support 126a. A spacer 192 is positioned about bolt 190 intermediate to flange 164 and chain support 126a. Sections 124a and 126a define a track 128 for chain 42. A chain hold down section 140a is connected to flange 166 by a bolt 194 which extends through a hole in flange 166 into chain hold down 140a. A spacer 196 is positioned about bolt 194 intermediate to flange 166 and chain hold down 140a. A chain support section 141a is connected to flange 166 by a bolt 198 which extends through a hole in flange 166 into chain support 140a. A spacer 199 is positioned about bolt 198 intermediate to flange 166 and chain support 141a. Sections 140a and 141a define a track 142 for chain 44.

Referring to FIG. 10 and FIG. 11, frame section 57 further comprises a track skeleton 200. Skelton 200 comprises a first steel transport track rib 202 which is welded or otherwise appropriately connected to tube 152 and a second steel transport track rib 204 which is also welded or otherwise appropriately connected to tube 152. A first transport track chain support bracket 206 is connected to rib 202 by a pair of bolts 208. Chain support section 92a is bolted or otherwise connected to bracket 206. A first transport track chain hold down bracket 210 is connected to rib 202 by a pair of bolts 212. Chain hold down section 90a is bolted or otherwise connected to bracket 210. A second transport track chain support bracket 214 is connected to rib 204 by a pair of bolts 216. Chain support section 108a is bolted or otherwise connected to bracket 214. A second transport track chain hold down bracket 218 is connected to rib 204 by a pair of bolts 220. Chain hold down section 106a is bolted or otherwise connected to bracket 218. Referring again to FIG. 9 and FIG. 11, one end of a first vertical bucket guide bar 222 is connected to chain support section 108a and the opposite end is connected to bracket 214. One end of a second vertical bucket guide bar 224 is connected to chain hold down section 106a and the opposite end is connected to bracket 218.

Referring again to FIG. 10 and FIG. 11, skeleton 200 comprises a first steel return track rib 226 which is welded or otherwise appropriately connected to tube 152 and a second steel return track rib 228 which is welded or otherwise appropriately connected to tube 152. A first return track chain hold down bracket 230 is connected to rib 226 by a pair of bolts 232. Chain hold down section 124a and control bar 134a are connected to bracket 230. A first return track chain support bracket 234 is connected to rib 226 by a pair of bolts 236. Chain support section 126a is bolted or otherwise connected to bracket 234. A second return track chain hold down bracket 238 is connected to rib 228 by a pair of bolts 240. Chain hold down section 140a is bolted or otherwise connected to bracket 238. A second return track chain support bracket 242 is connected to rib 228 by a pair of bolts 244. Chain support section 141a is bolted or otherwise connected to brakcet 242.

Referring again to FIG. 10 and FIG. 11, skelton 200 further comprises a first steel support plate 246 which extends between ribs 202 and 226. Plate 246 is connected to rib 202 by bolts 208 and 212 and to rib 226 by bolts 232 and 236. Skeleton 200 further comprises a second steel support plate 248 which extends between ribs 204 and 228. Plate 248 is connected to rib 204 by bolts 216 and 220 and to rib 228 by bolts 240 and 244.

Referring to FIG. 11 and FIG. 12, the vertical section 58 will be described in greater detail. Section 58 comprises a longitudinal steel tube 250 having a first angled steel plate 252 welded or otherwise connected on one end thereof and a second angled steel plate 254 welded or otherwise connected on the opposite end thereof. Plate 252 is bolted to plate 156. Section 58 further comprises a first vertical frame skeleton 256 and a second vertical frame skeleton 258. Skeleton 256 comprises a first steel transport track rib 260 and a second steel transport track rib 262, both of which are welded to tube 250. A first transport track chain hold down bracket 264 is secured to rib 260 by a pair of bolts 266. A first transport track chain support bracket 268 is connected to rib 260 by a pair of bolts 270. A second transport track chain hold down bracket 272 is connected to rib 262 by a pair of bolts 274. A second transport track chain support bracket 276 is connected to rib 262 by a pair of bolts 278.

Referring again to FIGS. 12, 13 and 14, skelton 256 further comprises a first steel return track rib 280 and a second steel return track rib 282 which are welded to tube 250. A first return track chain hold down bracket 284 is connected to rib 280 by a pair of bolts 286. A first return track chain support bracket 288 is connected to rib 280 by a pair of bolts 290. A second return track chain hold down bracket 292 is connected to rib 282 by a pair of bolts 294. A second return track chain support bracket 296 is connected to rib 282 by a pair of bolts 298.

Referring again to FIG. 10 and FIG. 14, skeleton 256 further comprises a first steel support plate 300 which extends between ribs 260 and 280. Plate 300 is connected to rib 260 by bolts 266 and 270 and to rib 280 by bolts 286 and 290. Skelton 256 further comprises a second steel support plate 302 which extends between ribs 262 and 282. Plate 302 is connected to rib 262 by bolts 274 and 278 and to rib 282 by bolts 294 and 298.

Referring again to FIGS. 12 and 13, skelton 258 comprises a first steel transport track rib 304 and a second steel transport track rib 306 which are welded to tube 250. A first transport track chain hold down bracket 308 is connected to rib 304 by bolts 310. A first transport track chain support bracket 312 is connected to rib 304 by pair of bolts 314. A second transport track chain hold down bracket 316 is connected to rib 306 by a pair of bolts 318. A second transport track chain support bracket 320 is connected to rib 306 by a pair of bolts 322.

Referring again to FIGS. 12 and 13, skelton 258 comprises a first steel return track rib 324 and a second steel return track rib 326 which are welded to tube 250. A first return track hold down bracket 328 is connected to rib 324 by a pair of bolts 330. A first return track chain support bracket 332 is connected to rib 324 by a pair of bolts 334. A second return track chain hold down bracket 336 is connected to rib 326 by a pair of bolts 338. A second chain support bracket 340 is connected to rib 326 by a pair of bolts 342.

Referring again to FIG. 13, skeleton 258 furhter comprises a first steel support plate 344 which extends between ribs 304 and 324. Plate 344 is connected to rib 304 by bolts 310 and 314 and to rib 324 by bolts 330 and 334. Skelton 258 further comprises a second steel support plate 346 which extends between ribs 306 and 326. Plate 346 is connected to rib 306 by bolts 318 and 322 and to rib 326 by bolts 338 and 342.

Referring again to FIG. 12, FIG. 13, and FIG. 14, a chain hold down section 90b is bolted or otherwise connected to brackets 264 and 308. A chain support section 92b is bolted or otherwise connected to brackets 268 and 312. Sections 90b and 92b define a track 94 for chain 42. A chain hold down section 106b is bolted or otherwise connected to bracket 272 and bracket 316. A chain support section 108b is bolted or otherwise connected to brackets 276 and 320. Sections 106b and 108b define a track 110 for chain 44. A vertical bucket control bar 222a is also bolted or otherwise connected to bracket 276 and bracket 320. A bucket control bar 224a is bolted or otherwise connected to bracket 272 and 316.

Referring again to FIG. 12, FIG. 13, and FIG. 14, a chain hold down section 124b is bolted or otherwise connected to bracket 284 and bracket 328. A bucket control bar section 134b is also connected to brackets 284 and 328. A spacer 135b may be positioned between return control bar 134b and brackets 284 and 328. A chain support section 126b is bolted or otherwise connected to bracket 288 and bracket 332. Sections 124b and 126b define a track 128 for chain 42. A chain hold down section 104b is bolted or otherwise connected to brackets 292 and 336. A chain support section 141b is bolted or otherwise connected to brackets 296 and 340. Sections 140b and 141b define a track 142 for chain 44.

Referring to FIG. 15, FIG. 16, FIG. 17, and FIG. 18, the upper corner section 59 will be described in greter detail. Section 59 comprises a steel tube 350 which has an angled steel plate 352 welded or otherwise connected on a first end thereof and a steel plate 354 on the opposite end thereof. Plate 352 is connected to plate 254. Section 59 further comprises a skelton 356. Skelton 356 comprises a first steel transport track rib 358 and a second steel transport track rib 360 which are welded to tube 350. A first return track hold down bracket 362 is connected to rib 358 by a pair of bolts 364. A first transport track support bracket 366 is connected to rib 358 by bolts 368. A second transport track hold down bracket 370 is connected to rib 360 by a pair of bolts 372. A second transport track chain support bracket 374 is connected to rib 360 by a pair of bolts 376.

Referring again to FIG. 17, skelton 356 further comprises a first steel return track rib 378 and a second steel return track rib 380 which are welded to tube 350. A first return track hold down bracket 382 is connected to rib 378 by a pair of bolts 384. A first return track chain support bracket 386 is connected to rib 378 by a pair of bolts 388. A second return track chain hold down bracket 390 is connected to rib 380 by a pair of bolts 392. A second return track chain support bracket 394 is connected to rib 380 by a pair of bolts 396.

Referring again to FIG. 17 and FIG. 18, skelton 356 further comprises a first steel support plate 398 which extends between ribs 358 and 378. Plate 398 is connected to rib 358 by bolts 364 and 368 and to rib 378 by bolts 384 and 388. Skelton 356 further comprises a second steel support plate 400 which extends between ribs 360 and 380. Plate 400 is connected to rib 360 by bolts 372 and 376 and to rib 380 by bolts 392 and 396.

Referring again to FIG. 16 and FIG. 18, plate 354 comprises an H-shaped plate having a central web portion 402 and a pair of wings 406 and 408 on opposite ends thereof. A first flange 410 is integral with wing 406 at approximately a right angle thereto. A second flange 412 is integral with wing 408 and at approximately a right angle thereto.

Referring again to FIG. 17 and FIG. 18, a chain hold down section 90c is bolted or otherwise connected to bracket 362 and is connected to flange 410 by a bolt 414 which extends through a hole in flange 410 into chain hold down 90c. A spacer 416 is positioned about bolt 414 intermediate to flange 410 and chain hold down 90c. A chain support section 92c is bolted or otherwise connected to bracket 366 and is connected to flange 410 by a bolt 418 which extends through a hole in flange 410 into chain support 92c. A spacer 420 is positioned about bolt 418 intermediate to flange 410 and chain support 92c. Sections 90c and 92c define a track 94 for chain 42. A chain support section 106c is bolted or otherwise connected to bracket 370 and connected to flange 412 by a bolt 422 which extends through a hole in flange 412 into chain hold down section 106c. A spacer 424 is positioned about bolt 422 intermediate to flange 412 and hold down 106c. A chain support section 108c is bolted or otherwise connected to bracket 374 and connected to flange 412 by a bolt 426 which extends through a hole in flange 412 into chain support 108c. A spacer 428 is positioned about bolt 426 intermediate to flange 412 and chain support 108c. Sections 106c and 108c define a track 110 for chain 44. A first vertical bucket control bar 222b is bolted or otherwise connected to bracket 374 and is connected to flange 412 by bolt 426 which extends into bar 222b. A second vertical bucket control bar 224b is bolted or otherwise connected to bracket 370 and is connected to flange 412 by bolt 422 which extends into bar 224b.

Referring again to FIG. 16, FIG. 17 and FIG. 18, a chain hold down section 124c is bolted or otherwise connected to bracket 382 and is connected to flange 410 by a bolt 430 which extends through a hole in flange 410 into chain hold down 124c. A spacer 432 is positioned about bolt 430 intermediate to flange 410 and hold down 124c. A chain support section 126c is bolted or otherwise connected to bracket 386 and is connected to flange 410 by a bolt 434 which extends through a hole in flange 410 into section 126c. A spacer 436 is positioned about bolt 434 intermediate to flange 410 and chain support section 126c. Sections 124c and 126c define a track for chain 42. A bucket control bar 134c is connected to bracket 382 and section 124c. A chain hold down section 140c is bolted or otherwise connected to bracket 390 and is connected to flange 412 by a bolt 438 which extends through a hole in flange 412 into hold down section 140c. A spacer 440 is positioned about bolt 438 intermediate to flange 412 and hold down 140c. A chain support section 141c is bolted or otherwise connected to bracket 394 and is connected to flange 412 by a bolt 442 which extends through flange 412 into chain support 141c. A spacer 444 is positioned about bolt 442 intermediate to flange 412 and chain support 141c. Sections 140c and 141 c define a track 142 for chain 44.

Figure 18:
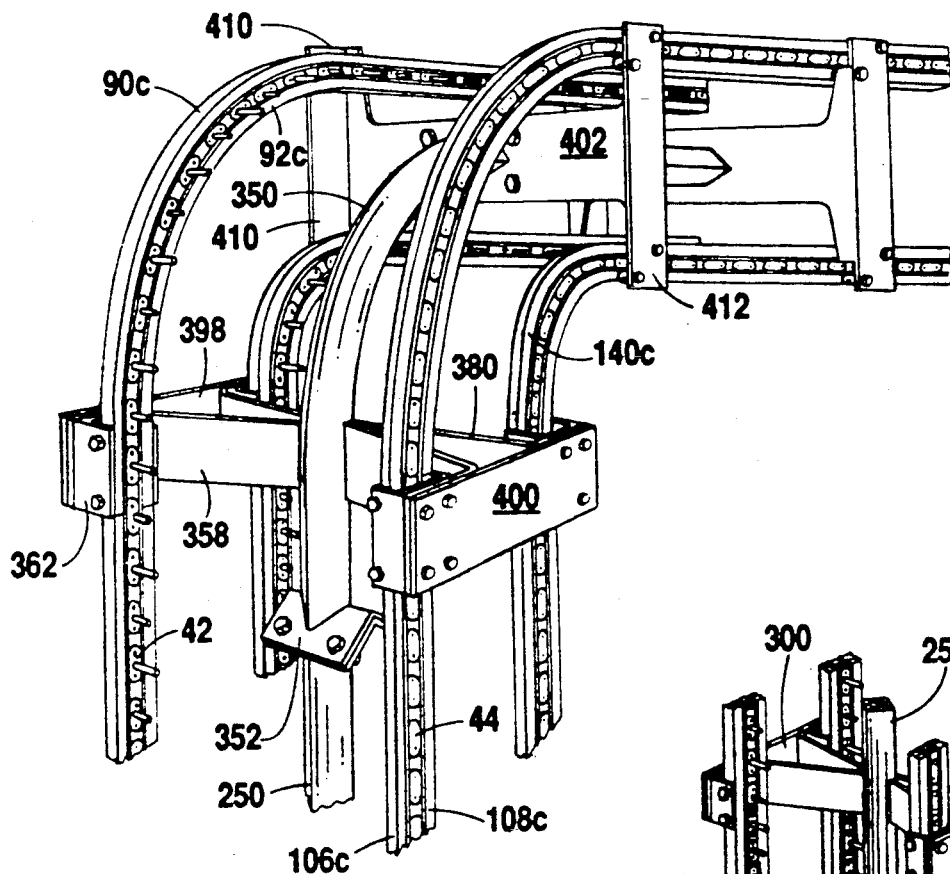
FIG. 18 is a perspective view of the upper corner section of the bucket conveyor frame of the present invention.

Referring to FIG. 19, FIG. 20, and FIG. 21, the upper horizontal section 60 will be described in greater detail. Section 60 comprises a first steel end plate 448 which is bolted or otherwise connected to a longitudinal steel tube 450 on a first end thereof and a second steel plate 452 which is bolted or otherwise connected to longitudinal tube 450 on a second end thereof. As illustrated in FIG. 18, plate 448 is bolted to plate 402. As illustrated in FIG. 3, plate 452 is bolted to H-shaped side 39 of housing 38. Tube 450 extends through approximately the center of, and is welded or otherwise connected to, a first H-shaped steel plate 454 and a second H-shaped steel plate 456. Plate 454 has a central web portion 458 and a pair of wings 460 and 462 on opposite ends thereof. A pair of opposed flanges 464 and 466 are integral with plate 458 and at approximately a right angle thereto. Likewise, plate 456 has a central web portion 468 and a pair of wings 470 and 472 on opposite ends thereof. A pair of oppositely disposed flanges 474 and 476 are integral with plate 468 and at approximately a right angle thereto.

Referring again to FIG. 19, FIG. 20, and FIG. 21, section 60 further comprises a first transport track chain hold down section 90d and a first transport track chain support section 92d. Chain hold down 90d is connected to flange 464 by a bolt 478 which extends through a hole in flange 464 and into hold down 90d. Chain hold down 90d is also connected to flange 474 by a bolt 480. A spacer 482 is positioned about bolt 478 intermediate to flange 464 and chain hold down section 90d and a spacer 484 is positioned about bolt 480 intermediate to flange 474 and chain hold down 90d. Chain support section 92d is connected to flange 464 by a bolt 486 which extends through a respective hole in flange 464 into chain support section 92d. Chain support section 92d is also connected to flange 474 by a bolt 488 which extends through a hole in flange 474 into chain support section 92d. A spacer 490 is positioned about bolt 486 intermediate to flange 464 and chain support 92d and a spacer 492 is positioned about bolt 488 intermediate to flange 474 and chain support section 92d. Sections 90d and 92d define a track 94 for chain 42.

Referring again to FIG. 19, FIG. 20, and FIG. 21, a second transport track chain hold down section 106d and a second transport track chain support section 108d are connected to flange 466 and define upper chain track 110 for chain 44. Chain hold down section 106d is connected to flange 466 by a bolt 494 which extends through a hole in flange 466 into chain hold down 106d. Chain hold down 106d is also connected to flange 476 by a bolt 496 which extends through a hole in flange 476 into chain hold down 106d. Bolts 494 and 496 also extend through hold down 106d into bucket hold down bar 114a. A spacer 498 is positioned about bolt 494 intermediate to hold down 106d and flange 466 and a spacer 500 is positioned about bolt 494 intermediate to bucket hold down bar 114a and chain hold down 106d. A spacer 502 is positioned about bolt 496 intermediate to hold down section 106d and flange 476 and a spacer 504 is positioned about bolt 496 intermediate to hold down bar 114a and chain hold down section 106d. Chain support section 108d is connected to flange 466 by a bolt 506 which extends through a hole in flange 466 into chain support 108d. Chain support 108d is also connected to flange 476 by a bolt 508 which extends through a hole in flange 476 into support 108d. A spacer 510 is positioned about bolt 506 intermediate to chain support 108d and flange 466 and a spacer 512 is positioned about bolt 508 intermediate to chain support 108d and flange 476. Sections 106d and 108d define a track 110 for chain 44.

Referring again to FIG. 19, FIG. 20 and FIG. 21, a first return track chain hold down section 124d and a first return track chain support 126d define lower chain track 128 for roller chain 42. chain hold down 124d is connected to flange 464 by a bolt 514 which extends through a hole in flange 464 into chain hold down section 124d. Chain hold down 124d is also connected to flange 474 by a bolt 516 which extends through a hole in flange 474 into chain hold down 124d. A spacer 518 is positioned about bolt 514 intermediate to flange 464 and hold down 124d and a spacer 520 is positioned about bolt 516 intermediate to flange 474 and hold down 124d. A bucket control bar 134d is also appropriately connected to hold down 124d and spacers 135d are positioned intermediate to bar 134d and hold down 124d. Chain support section 126d is connected to flange 464 by bolt 522 which extends through a hole in flange 464 into chain support 126d. Chain support 126d is also connected to flange 474 by a bolt 524 which extends through a hole in flange 474 into chain support 126d. A spacer 528 is positioned about bolt 522 intermediate to chain support 126d and flange 464 and a spacer 530 is positioned about bolt 524 intermediate to flange 474 and chain support 126d. Sections 124d and 126d define a track 128 for chain 42. A second return track chain hold down 140d and a second return track chain support section 141d define lower chain track 142 for chain 44. Chain hold down section 140d is connected to flange 466 by a bolt 432 which extends through a hole in flange 466 into hold down section 140d. Chain hold down section 140d is also connected to flange 476 by a bolt 434 which extends through a hole in flange 476 into hold down 140d. A spacer 536 is positioned about bolt 432 intermediate to flange 466 and hold down 140d and a spacer 538 is positioned about bolt 434 intermediate to flange 476 and hold down section 140d. Chain support section 141d is connected to flange 466 by a bolt 540 which extends through a hole in flange 466 into chain support 141d. Chain support 141d is also connected to flange 476 by a bolt 542 which extends through a hole in flange 476 into chain support 141d. A spacer 544 is positioned about bolt 540 intermediate to chain support 141d and flange 466 and a spacer 546 is positioned about bolt 542 intermediate to flange 476 and chain support 141d. Sections 140d and 141d define a track 142 for chain 44.

It is to be understood that plates 70 and 72 and plates 454 and 456 lie in substantially vertical planes substantially perpendicular to the direction of bucket travel. Plates 246, 248, 300, 302, 344, 346 and 398, 400 also lie in substantially vertical planes. It is further to be understood that the bucket conveyor frame 40 of the present invention eliminates the need for intermediate sprockets at the corner sections 57 and 59. It is further to be understood that rectangular tubes 66 and 450 are positioned at an angle approximately forty five degrees relative to horizontal such that a corner of the respective tube points toward the buckets 46. Such a configuration reduces the flat or horizontal areas upon which debris or dirt can collect. The utilization of angled plates 156, 252, 254, and 352 further reduces the flat or horizontal areas upon which dirt and debris can accumulate. That is, the likelihood of dust, dirt or debris accumulating on tubes 66 or 450 or plates 156, 252, 254, and 352 or plates 246, 248, 300, 312, 344, 346, 398 and 400 is substantially reduced due to the configuration of such elements. Likewise, the configuration of tubes 152 and 350 in the corner sections of the conveyor frame 40 such that a corner of the respective tube points toward the buckets 46 also reduces the likelihood of dust, dirt or debris gathering on the respective tube.

It is to be understood that the respective chain track sections described herein are constructed of aluminum with UHMW plastic connected thereto in a press fit so as to form the actual track surface. It is also to be understood that, in an alternate embodiment, each pair of support plates 246, 248, 300, 302, 344, 346, and 398, 400 may be replaced by a pair of U-shaped braces that extend between the outside or transport track sections and between the inside or return track sections. For example, a plate may extend across ribs 226 and 228 and have flanges on each end thereof at right angles thereto which are bolted to ribs 226 and 228 by bolts 232, 236 and 240, 244. Likewise, a complementary plate may extend between ribs 202 and 204 and have flanges at right angles thereto on opposite ends thereof which are bolted to ribs 202 and 204 by bolts 208, 212 and 216, 220. It is also to be understood that as the buckets 46 travel in their continuous loop or path throughout the conveyor, a boss or protrusion on the buckets 46 will be received within the vertical bucket control bars 222, 224 in section 57, bars 222a, 224a in section 58, and bars 222b, 224b in section 59, thereby maintaining the stability of the buckets 46. Likewise, the bucket return control bars 134, 134a, 134b, 134c, and 134d will maintain stability of the buckets 46 as they travel in their return path to the infeed station 24.

While the bucket conveyor frame has been described in connection with the preferred embodiment, it is not intended to limit the invention to the particular form set forth, but on the contrary, it is intended to cover such alternatives, modifications and equivalents as may be included within the spirit and scope of the invention as defined by the appended claims.

We claim:

1. A frame for an endless conveyor, comprising:
   a plurality of sections defining a conveying run and a return run;
   a tube positioned along approximately the central axis of said frame between said conveying run and said return run and between lateral edges of said frame;
   guide means connected to said tube for providing said lateral edges; and
   complementary plates for connecting said sections, said plates being downwardly sloped.

2. A frame for an endless conveyor, as recited in claim 1, wherein said tube comprises a generally rectangular tube, an edge of which is adjacent to said conveying run.

3. A frame for an endless conveyor, as recited in claim 1, further comprising first sprocket means on one end of said frame and second sprocket means on an opposite end of said frame.

4. A frame for an endless conveyor, comprising:
   a horizontal section defining a conveying run and a return run and having a tube positioned along approximately the central axis of said horizontal section between said conveying run and said return run and between lateral edges of said horizontal section;
   a vertical section defining a conveying run and a return run and having a tube positioned along approximately the central axis of said vertical section between said conveying run and said return run and between lateral edges of said vertical section;
   horizontal section guide means connected to said horizontal section tube, said horizontal section guide means comprising a plurality of H-shaped plates; and
   vertical section guide means connected to said vertical section tube, said vertical section guide means comprising a plurality of diverging ribs, each of said ribs being connected on one end thereof to said tube and on an opposite end thereof to a plate.

5. A frame for an endles conveyor, as recited in claim 4, wherein said horizontal section tube comprises a generally rectangular tube, an edge of which is adjacent to said horizontal section conveying run.

6. A frame for an endless conveyor, as recited in claim 4, further comprising first sprocket means on one end of said frame and second sprocket means on an opposite end of said frame.

7. A frame for an endless conveyor, comprising:
   a horizontal section defining a conveying run and a return run and having a tube positioned along approximately the central axis of said horizontal section between said conveying run and said return run and between lateral edges of said horizontal section;
   a vertical section defining a conveying run and a return run and having a tube positioned along approximately the central axis of said vertical section between said conveying run and said return run and between lateral edges of said vertical section;
   horizontal section guide means connected to said horizontal section tube, said horizontal section guide means comprising a plurality of H-shaped plates;
   vertical section guide means connected to said vertical section tube, said vertical section guide means comprising a plurality of divergent ribs, each of said ribs being connected on one end thereof to said tube and on an opposite end thereof to a plate; and
   means for connecting said horizontal section to said vertical section.

* * * * *